(12) United States Patent
Kaneko et al.

(10) Patent No.: US 6,466,378 B2
(45) Date of Patent: Oct. 15, 2002

(54) LENS DRIVING APPARATUS

(75) Inventors: Keiji Kaneko; Atsushi Kanayama, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/803,946

(22) Filed: Mar. 13, 2001

(65) Prior Publication Data

US 2001/0030813 A1 Oct. 18, 2001

(30) Foreign Application Priority Data

Mar. 13, 2000 (JP) ........................................ 2000-068926

(51) Int. Cl.[7] ........................... G02B 15/14; G03B 17/00
(52) U.S. Cl. ........................................ 359/697; 396/76
(58) Field of Search .......................... 359/696, 697; 396/76, 86, 87; 348/358

(56) References Cited

U.S. PATENT DOCUMENTS

| | | | | |
|---|---|---|---|---|
| 5,130,732 A | * | 7/1992 | Furutsu | 396/89 |
| 5,192,965 A | * | 3/1993 | Suzuki et al. | 396/96 |
| 5,262,868 A | | 11/1993 | Kaneko et al. | 358/209 |
| 5,274,827 A | | 12/1993 | Haggerty et al. | 395/750 |
| 5,602,613 A | * | 2/1997 | Akimoto et al. | 396/133 |
| 5,642,180 A | * | 6/1997 | Yoshida | 396/207 |
| 5,943,263 A | | 8/1999 | Roohparvar | 365/185.18 |
| 6,035,137 A | | 3/2000 | Kaneko et al. | 396/76 |

FOREIGN PATENT DOCUMENTS

| | | | | |
|---|---|---|---|---|
| JP | 07058993 | 3/1995 | | H04N/5/232 |
| JP | 11167175 | 6/1999 | | G03B/43/00 |

* cited by examiner

*Primary Examiner*—Ricky Mack

(57) ABSTRACT

The CPU of the lens drive unit obtains new data to be stored in an EEPROM from a personal computer. The CPU confirms with a supplied voltage confirmation circuit that voltage supplied from a power source to the lens drive unit is sufficient to reprogram the contents of the EEPROM. When the voltage of the power source is sufficient, a reprogramming voltage is applied from a reprogramming voltage applying device to the EEPROM, and the contents of the EEPROM are reprogrammed with the new data obtained from the personal computer. If the voltage of the power source is insufficient, the reprogramming of the contents of the EEPROM is not performed.

10 Claims, 4 Drawing Sheets

LENS DRIVING APPARATUS

BACKGROUND OF THE INVENTION

1. Field of the Invention

The present invention relates to a lens driving apparatus, particularly to a lens driving apparatus that records data such as a program in an Electrically Erasable Programmable Read Only Memory (EEPROM) whose contents can be electrically reprogrammed, and that controls lenses in accordance with data stored in the EEPROM.

2. Description of Related Art

The use of TV cameras has been increasing with a need for digital broadcasting and a virtual studio, and control of the TV lens apparatus has been required to have high precision. Among such lens apparatuses, the digital control by a microcomputer has been greatly improved.

In controlling the lens apparatus by the microcomputer, programs for operating the microcomputer and respective optical data for lenses and so forth are required. The data required for such control by the microcomputer is written in a ROM in a manufacturing process, and is built in the lens apparatus or in the drive unit for driving the lens.

Because the lens apparatus of that type is globally marketed, the same type of program is naturally recorded in the ROM for the lens apparatus of the same type and is built in the lens apparatus or the drive unit (Japanese Patent Application Laid-open No.7-58993).

Although the program and the like which is recorded in the ROM and is built in the lens apparatus or the drive unit basically does not require updating data, yet update of program and the like is seldom required under following situations of users or manufacturers, for example:

1) change of versions by user (such as change of data for a lens accompanied by change of versions of the lens controller, or change of serial interface protocol);
2) change of versions by manufacturer (such as change in optical data and adjusting the data to a new product); and
3) program error (error in program which could not be found in an inspection in the factory).

Conventionally, in a case where such situation arises, a cover of the lens apparatus or the drive unit must be removed so as to replace the ROM or to reprogram the contents of the ROM by a ROM writer, which cause troublesome processes and increase of cost. Further, collecting the globally marketed lens apparatus and replacing the ROM are difficult, and changes of programs has been troublesome to both the manufacturers and the users.

SUMMARY OF THE INVENTION

The present invention has been developed in view of the above-described circumstances, and has as its object the provision of a lens driving apparatus in which the contents such as a program stored in a ROM can be easily updated.

In order to achieve the above-described object, the present invention is directed to a lens driving apparatus, comprising: a ROM which stores data used for controlling the lens driving apparatus, contents of the ROM being electrically reprogrammable; a data obtaining device which obtains new data from an external device; and a reprogramming device which reprograms the contents of the ROM with the new data.

Preferably, the lens driving apparatus of the present invention further comprises a control device which measures power source voltage supplied to the lens driving apparatus, the control device inhibiting the reprogramming device from reprogramming the contents of the ROM when the power source voltage is lower than a required voltage for reprogramming the contents of the ROM.

Preferably, the lens driving apparatus of the present invention further comprises an alarm device, the control device causing the alarm device to alarm when the power source voltage is lower than the required voltage.

According to the present invention, data such as a program required for controlling a lens is recorded in a memory (ROM) whose contents can be electrically reprogrammed and used exclusively for reading out, and new data is obtained from an external unit such as a personal computer, then the data in the ROM can be updated to be the new data. Therefore, exchange of ROMs and data writing into the ROM with special tools are unnecessary, and further, a user can obtain the new data from the manufacturer and the like by a communication means such as the internet, or the user can update the user's own ROM data by obtaining a record medium in which the new data is recorded, without always handing the actual lens apparatus to the manufacturer. Thus, the data such as a program can be changed in response to needs and as well as with low cost; hence the users and the manufacturers can easily change versions of a soft data for the lens system.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder a preferred embodiment will be described in detail for a lens driving apparatus of the present invention in accordance with the accompanying drawings.

Figure 1:
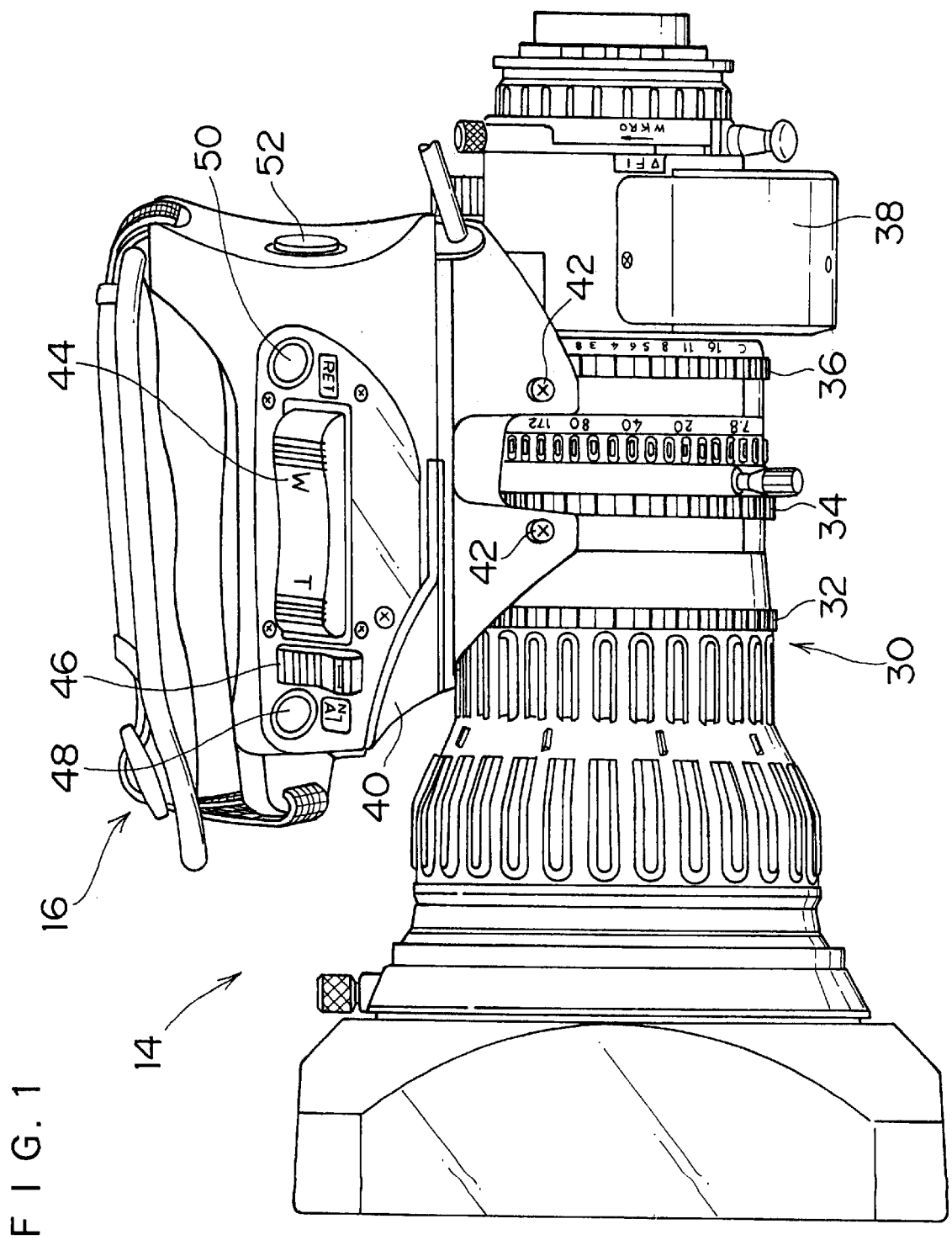
FIG. 1 is a plan view showing an outer appearance of an ENG lens to which the present invention is applied.
Figure 2:
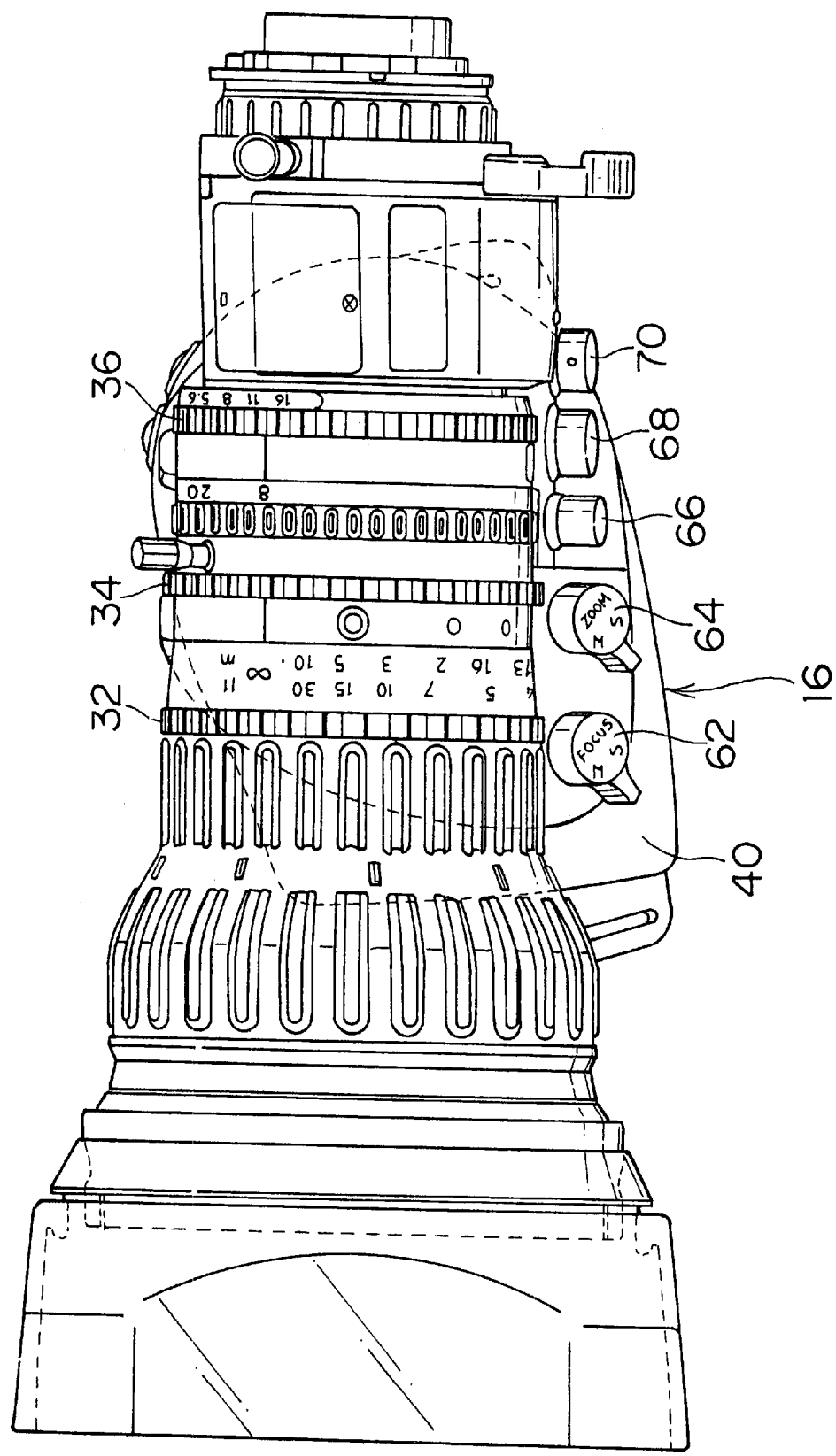
FIG. 2 is a side view showing the outer appearance of the ENG lens to which the present invention is applied.

FIGS. 1 and 2 are a plan view and a side view, respectively, showing an outer appearance of an ENG lens to which the present invention is applied. The ENG lens 14 in FIGS. 1 and 2 is a zoom lens of inner focus type, which is used for a broadcasting TV camera such as an ENG camera. A lens barrel 30 in the ENG lens 14 is provided with a focus ring 32, a zoom ring 34, and an iris ring 36, and an extender unit 38 is provided at the rear end of the lens barrel 30.

When the focus ring 32 is rotated, the focus lens moves along the optical axis, so that the focus can be adjusted. When the zoom ring 34 is rotated, the zoom lens moves along the optical axis, so that the zoom can be adjusted. When the iris ring 36 is rotated, a diameter of the iris changes, so that the iris can be adjusted.

A drive unit 16 is mounted at the side of the lens barrel 30. The drive unit 16 drives the focus ring 32, the zoom ring 34, the iris ring 36, and so forth. The drive unit 16 has a case 40, which is attached to the side of the lens barrel 30 with screws 42. A focus drive motor, a zoom drive motor, and an iris drive motor, all of which not shown, are arranged in the case 40, and the focus ring 32, the zoom ring 34 and the iris ring 36 are rotated through gear transmission mechanisms (not shown) by driving the motors.

A zoom seesaw control switch 44 (hereunder called a seesaw switch), an auto/manual mode selection switch 46 for the iris control, an iris momentary switch 48, a return switch 50, a VTR switch 52, and so forth, are disposed on the surface the of case 40. The lenses can be respectively controlled by operating the above-mentioned operating switches. For example, when the seesaw switch 44 is pressed to a tele (T) side or to widephoto (W) side with the neutral position as the reference position, the zoom drive motor rotates in a rotation direction corresponding with a pressing direction and at the rotation rate corresponding with the pressed amount, then the zoom ring 34 rotates in connection with the rotation of the zoom drive motor.

At the bottom of the case 40 in FIG. 2, a focus servo/manual mode switching knob 62, a zoom servo/manual mode switching knob 64, an RS232C connector 66, a focus control connector 68, and a zoom control connector 70 are disposed. The focus control connector 68 is connected with a general focus controller, which designates a focus position with a rotated position of a rotatable focus knob, and the zoom control connector 70 is connected with a general zoom controller, which designates a zoom rate with a rotated position of a rotatable thumb ring. When connecting the focus controller and the zoom controller with the connectors 68 and 70, the focus drive motor and the zoom drive motor and so forth of the drive unit 16 are controlled in accordance with control signals from the external controllers. Data is exchanged via the connectors 68 and 70 through an RS485 interface, for example.

The RS232C connector 66 is connected with an external control unit such as a personal computer via an RS232C cable, and the drive unit 16 and the external control unit exchange data via the connector 66 through the RS232C interface. The RS232C connector 66 is used for self-diagnosing and lens control by the personal computer and the like.

When reprogramming contents of a ROM in the drive unit 16 as presented below, the personal computer is connected with the RS232C connector 66 so as to instruct reprogramming ROM data from the personal computer while transmitting the data to be newly recorded in the ROM in order to reprogram the ROM data. If reprogramming of the contents of the ROM is desired because of change of versions by the user or by the manufacturer, or due to an error in the program, the contents can be easily reprogrammed by the personal computer. When the manufacturer provides data of a new program through the Internet, the user can obtain the new data through the Internet and the like and reprogram the contents of the ROM.

Figure 3:
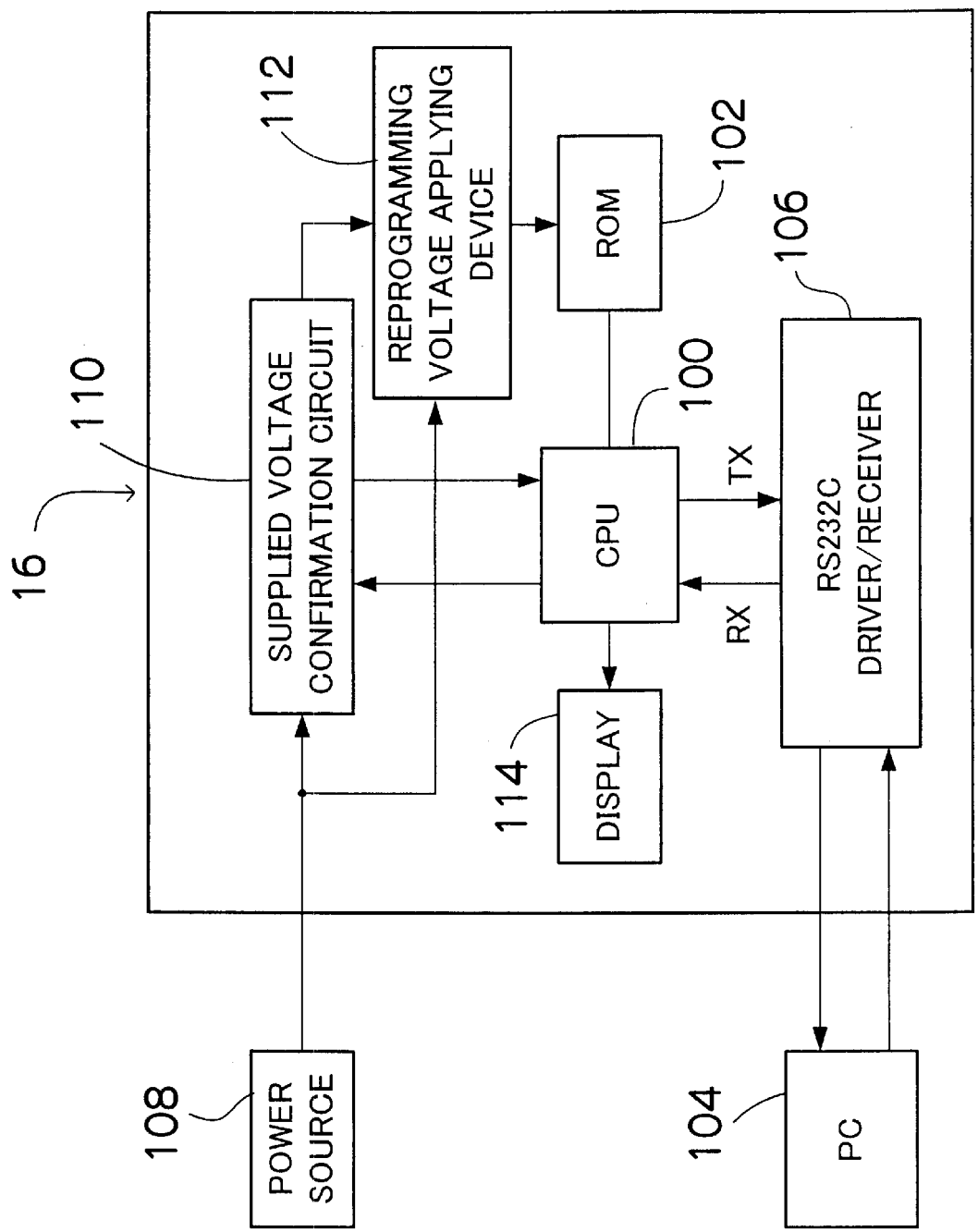
FIG. 3 is a block diagram showing a construction of a drive unit in a case where contents of an ROM built in the drive unit can be reprogrammed by an external control unit.

FIG. 3 is a block diagram showing an embodiment according to the present invention where the contents of the ROM built in the drive unit 16 are reprogrammable. As shown in FIG. 3, a CPU 100 for processing various lens controls (e.g. motor control in accordance with operation of the respective operating switches), and a ROM 102 in which data required for lens controls executed by the CPU 100 is recorded, are installed in the drive unit 16. In FIG. 3, a construction related to the lens controls that are normally performed by the CPU 100 is not shown, and the CPU 100 is shown as a means for processing reprogramming the contents of the ROM 102. The ROM 102 is an EEPROM (flash ROM and the like) which can electrically reprogram the contents thereof. Previous data that has been recorded in the ROM 102 is deleted by applying a voltage required for reprogramming, so that new data can be written in the ROM 102.

When updating the data in the ROM 102, an external unit 104 (e.g., a personal computer) for updating data is connected with the drive unit 16 as shown in FIG. 3. The connector for the drive unit 16 with which the personal computer 104 is connected is the RS232C connector 66 in FIG. 2. However, another connector (and an RS232C driver/receiver 106 which will be described later) with which the external control unit for updating data is connected may be specially provided in that purpose.

The RS232C connector 66 is connected with an RS232C driver/receiver 106, and the personal computer 104 connected with the RS232C connector 66 is capable of serial communication with the CPU 100 in an interface standard of the RS232C interface. By this communication, the personal computer 104 transmits a command for reprogramming the contents of the ROM 102 (ROM reprogramming command) to the CPU 100, and also transmits new data to be written in the ROM 102 to the CPU 100. When receiving the ROM reprogramming command from the personal computer 104, the CPU 100 switches the process from the normal lens control to reprogramming of the contents of the ROM 102, and executes reprogramming the contents of the ROM 102 only when the voltage of a power source 108 is not lower than a required voltage for reprogramming the contents of the ROM 102 as described below.

The power source 108 of the drive unit 16 is provided outside the drive unit 16, and is usually a rechargeable battery. Hence, the voltage supplied from the power source 108 is seldom lowered when charged electricity of the power source 108 is decreased or the electricity is being consumed at another activation part. Because the ROM 102 requires a voltage no lower than the appropriate voltage for reprogramming the contents thereof, the drive unit 16 is provided with a supplied voltage confirmation circuit 110 for confirming the voltage of the power source 108. When the CPU 100 receives the ROM reprogramming command from the personal computer 104, the CPU 100 outputs a reprogramming voltage confirmation signal to the supplied voltage confirming circuit 110. When receiving the reprogramming voltage confirmation signal from the CPU 100, the supplied voltage confirmation circuit 110 measures the voltage of the power source 108, and confirms whether the voltage is not lower than the required voltage for reprogramming the contents of the ROM 102. Then, when the measured voltage is not lower than the required voltage for reprogramming the contents of the ROM 102, the supplied voltage confirming circuit 110 outputs an OK signal indicating the confirmation of the voltage to a reprogramming voltage applying device 112. On the other hand, if the voltage of the power source 108 is lower than the required voltage for reprogramming the contents of the ROM 102, the supplied voltage confirming circuit 110 outputs the OK signal to neither CPU 100 nor reprogramming voltage applying device 112.

When the reprogramming voltage applying device 112 receives the OK signal from the supplied voltage confirming circuit 110, the reprogramming voltage applying device 112 converts the voltage supplied from the power source 108 to be an appropriate voltage (reprogramming voltage) for reprogramming the contents of the ROM 102, and applies the reprogramming voltage to the ROM 102. Thereby, the contents of the ROM 102 become reprogrammable. In contrast, when the supplied voltage confirming circuit 110 does not provide the OK signal to the reprogramming voltage applying device 112, the reprogramming voltage applying device 112 inhibits reprogramming of the contents by not applying the reprogramming voltage to the ROM 102. The power required for normal reading out of data and so forth is always supplied, for which power source line is not shown in FIG. 3.

When the CPU 100 receives the OK signal from the supplied voltage confirming circuit 110, the CPU 100 deletes the previous data in the ROM 102 and records the new data sent from the personal computer 104 into the ROM 102. At the time the reprogramming process is completed, the CPU 100 stops the supplied voltage confirming circuit 110 from outputting the OK signal so as to stop the reprogramming voltage applying device 112 from applying the reprogramming voltage to the ROM 102.

If the supplied voltage confirming circuit 110 does not provide the OK signal, the CPU 100 does not perform the reprogramming of the contents of the ROM 102, and instead displays on a display 114, which is provided on the external surface of the case 46 of the drive unit 16, an error signal (alarm display) that the voltage of the power source is insufficient to perform the reprogramming of the contents of the ROM 102. At the same time, the CPU 100 transmits an error command to the personal computer 104 via the RS232C driver/receiver 106. The display 114 may display the error signal by flashing a lamp, or may display letters or a symbol of error on a liquid crystal display. The CPU 100 may cause another device to make a sound to represent the error instead of the display 114. When the personal computer 104 receives the error command, both cases are possible that the personal computer 104 does display or does not display the error on a monitor thereof. In a case where the personal computer 104 displays the error on the monitor thereof, the display 114 of the drive unit 16 does not have to display the error, or the drive unit 16 has no need to include the display 114.

Figure 4:
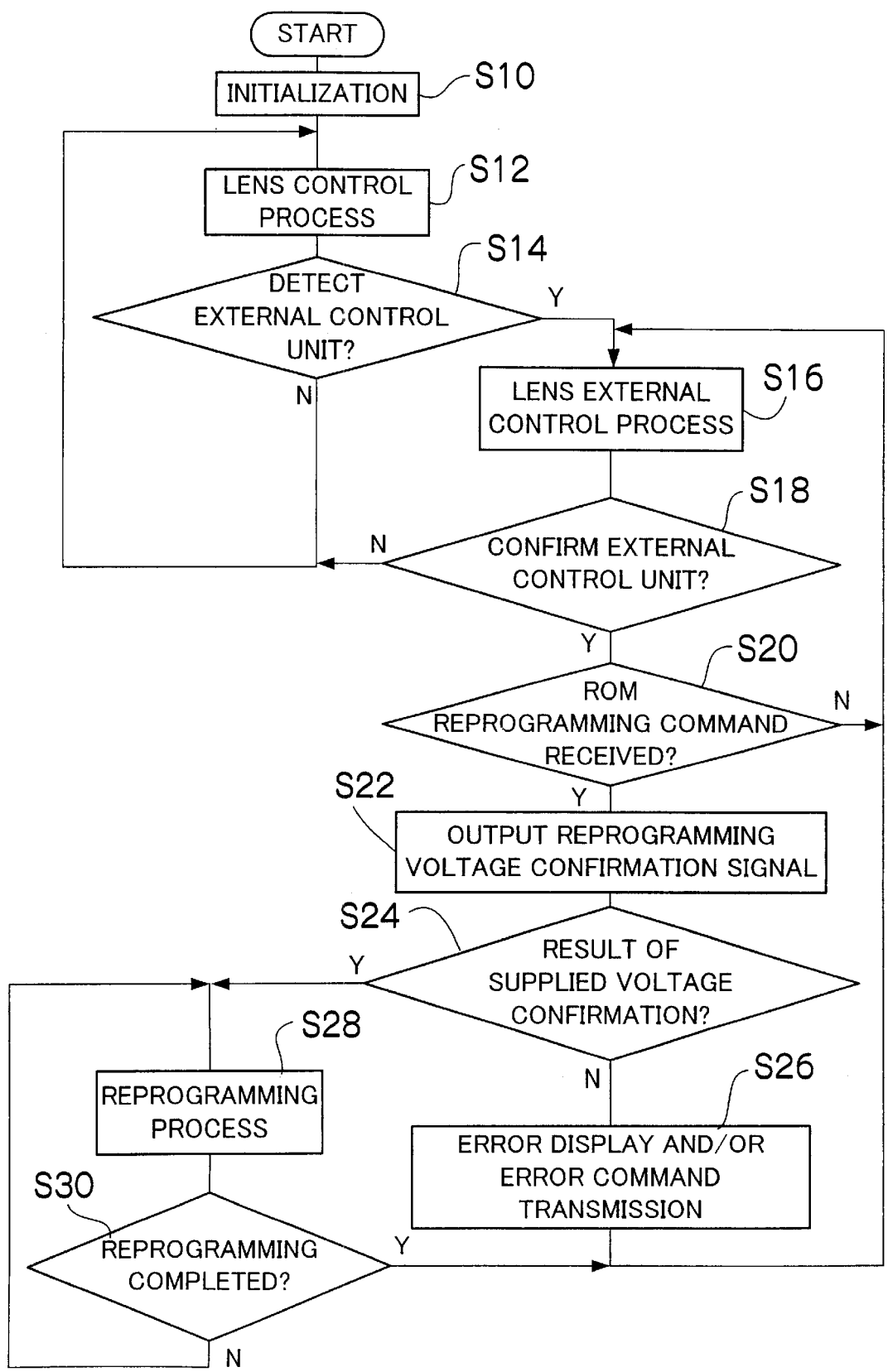
FIG. 4 is a flowchart showing a procedure of a CPU for the drive unit.

FIG. 4 is a flowchart showing a procedure for the CPU 100. First, the CPU 100 initializes at the time of starting the process (S10), and executes a process for a normal lens control (S12). The CPU 100 determines whether or not the external control unit (the personal computer 104) is connected via the RS232C driver/receiver 106 (S14). If the determination at S14 is NO, the procedure starting from S12 is executed repeatedly. If the determination at S14 is YES, a process in accordance with the command sent from the external control unit is executed (S16). If a command related to a normal lens control is sent from the external control unit, the CPU 100 executes the lens control such as zoom and focus in accordance with the command.

Next, the CPU 100 determines whether or not the external control unit is connected (S18). If the determination at S18 is NO, the procedure returns to S12. If the determination at S18 is YES, whether or not the ROM reprogramming command is received from the external control unit is determined (S20). If the determination at S20 is NO, the procedure returns to S16.

If the determination at S20 is YES, that is, if the ROM reprogramming command is received from the external control unit, the CPU 100 outputs a reprogramming voltage confirming signal to the supplied voltage confirming circuit 110 (S22). Then, the voltage of the power source 108 is measured by the supplied voltage confirming circuit 110. The CPU 100 confirms the voltage measured by the supplied voltage confirming circuit 110, that is, the CPU 100 determines whether or not the OK signal is outputted from the supplied voltage confirming circuit 110 (S24). If the determination at S24 is NO, that is, if the voltage of the power source 108 is lower than the required voltage for reprogramming the contents of the ROM 102 and the OK signal cannot be provided, the CPU 100 displays an error on the display 114 and/or transmits an error command to the external control unit (S26). Then, the procedure returns to S16 without processing the reprogramming of the contents of the ROM 102.

If the determination at S24 is YES, that is, the voltage of the power source 108 is not lower than the required voltage for reprogramming the contents of the ROM 102, the CPU 100 executes the reprogramming of the contents of the ROM 102 until the reprogramming process is completed (S28 and S30). In other words, the previous data recorded in the ROM 102 is deleted and the new data is obtained from the external control unit, and the new data is successively recorded in predetermined addresses of the ROM 102. After the completion of the reprogramming process, the procedure returns to S16 when the determination is YES at S30.

As described above, in the embodiment presented above, the external control unit (the personal computer 104) for updating the data in the ROM 102 and the CPU 100 of the drive unit 16 can exchange data through the serial communication via the RS232C interface; however, the communication method is not limited to that and a desired method can be applied. Moreover, the connector for connecting the external control unit may be the connector with which the focus controller or the zoom controller is connected (i.e., the focus control connector 68, the zoom control connector 70, etc.), and the external control unit and the CPU 100 can communicate with each other via a communication method of the controller.

Moreover, the process in the external control unit for reprogramming the contents of the ROM 102 may be performed by a personal computer or a controller for lens control, or a self-diagnosing device. The external control unit that is exclusively used for updating the data in the ROM 102 is not always necessary.

In the embodiment described above, updating data in the ROM 102 in the drive unit 16 of the ENG lens 14 is described; however, the present invention may be applied to updating data in a ROM that is installed in an box-shaped EFP lens, or in a ROM that is installed in the lens controller (focus controller, zoom controller, and so forth).

Further, the present invention can also be applied not only to a lens driving apparatus in a TV lens system, but also to a lens system for a still camera.

As described above, according to the lens driving apparatus of the present invention, the data such as a program is recorded in the ROM whose contents are electrically reprogrammable, and the new data is obtained from the external unit such as the personal computer, then the data in the ROM can be updated to be the new data. Therefore, exchanging ROM and writing into the ROM using special tools are not necessary, and the actual article does not have to be handed to the manufacturer, and further, the user can obtain the new data from the manufacturer through a communication means such as the internet, or the user can obtain a record medium in which the new data is recorded and update the data in the user's own ROM. Thus, the data such as a program can be changed in response to needs and as well as with low cost; hence the users and the manufacturers can easily change versions of the soft data for the lens system.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens driving apparatus, comprising:
   a ROM which stores data used for controlling the lens driving apparatus, contents of the ROM being electrically reprogrammable;
   at least one connector with which an external device is connected, the external device transmitting new data to be recorded in said ROM;
   a data obtaining device which obtains new data by receiving a reprogramming command and new data through said connector from the external device; and
   a reprogramming device which reprograms the contents of the ROM with the new data.

2. The lens driving apparatus as set forth in claim 1, further comprising a control device which measures power source voltage supplied to the lens driving apparatus, the control device inhibiting the reprogramming device from reprogramming the contents of the ROM when the power source voltage is lower than a required voltage for reprogramming the contents of the ROM.

3. The lens driving apparatus as set forth in claim 2, further comprising an alarm device, the control device causing the alarm device to alarm when the power source voltage is lower than the required voltage.

4. The lens driving apparatus as set forth in claim 1, wherein the at least one connector receives data from the external device transmitting new data and data from an external device controlling the lens.

5. The lens driving apparatus as set forth in claim 4, wherein the external device transmitting new data is also capable of being the external device controlling the lens.

6. The lens driving apparatus as set forth in claim 1, wherein the ROM is contained within the lens driving apparatus and the external device is external to the lens driving apparatus.

7. The lens driving apparatus as set forth in claim 1, wherein the reprogramming device is contained within the lens driving apparatus, the lens driving apparatus contained within a case.

8. The lens driving apparatus as set forth in claim 7, wherein the at least one connector is connected externally to the case.

9. The lens driving apparatus as set forth in the claim 2, wherein when the reprogramming command is received by the data obtaining device, the data obtaining device outputs a reprogramming voltage confirmation signal to the control device.

10. A method for reprogramming a ROM in a lens driving apparatus, comprising:
    attaching a ROM within the lens driving apparatus, the contents of the ROM being electrically reprogrammable;
    connecting at least one connector to a device external to the lens driving apparatus;
    transmitting new data to be recorded in said ROM from the external device;
    obtaining new data for the ROM by receiving both a reprogramming command and the new data through the at least one connector from the external device; and
    reprogramming the contents of the ROM with the new data.

* * * * *